United States Patent [19]
Ieki et al.

[11] Patent Number: 5,068,530
[45] Date of Patent: Nov. 26, 1991

[54] OPTICAL ENCODER

[75] Inventors: Atsushi Ieki; Keiji Matsui, both of Aichi, Japan

[73] Assignee: Kabushiki Kaisha Okuma Tekkosho, Aichi, Japan

[21] Appl. No.: 552,929

[22] Filed: Jul. 13, 1990

[30] Foreign Application Priority Data

Jul. 17, 1989 [JP] Japan .................................. 1-183871

[51] Int. Cl.$^5$ ........................... H01J 3/14; H01J 5/16; H01J 40/14
[52] U.S. Cl. ........................... 250/237 G; 250/231.16; 356/374
[58] Field of Search ...................... 250/231.16, 237 G; 356/374, 375, 128

[56] References Cited

U.S. PATENT DOCUMENTS

| 3,983,390 | 9/1976 | Liop ..................................... 356/128 |
| 4,943,716 | 7/1990 | Ichikawa et al. ............... 250/231.16 |
| 4,979,827 | 12/1990 | Matsui ............................ 250/237 G |
| 4,985,623 | 1/1991 | Ichikawa et al. ............... 250/237 G |

Primary Examiner—David C. Nelms
Assistant Examiner—T. Davenport
Attorney, Agent, or Firm—Wenderoth, Lind & Ponack

[57] ABSTRACT

An optical encoder of the present invention includes a first diffraction grating and a second diffraction grating which is displaceable relative to the first diffraction grating to detect the relative displacement. The second diffraction grating has a grating pattern which removes a component having a period which is a factor of 1/n (n: a positive odd number) of the period of a displacement signal representing the relative displacement. In the optical encoder according to the present invention, higher harmonic components are cancelled by adding the amounts of light which passes through the grating portions whose phase differs by a predetermined distance. Consequently, a non-distorted displacement signal can be obtained.

7 Claims, 6 Drawing Sheets

OPTICAL ENCODER

BACKGROUND OF THE INVENTION

1. Field of the Invention

The present invention relates to an optical encoder which is used for position measurement in a machine tool or a semiconductor manufacturing apparatus.

2. Description of the Prior Art

FIG. 1 is a perspective view of an example of a conventional optical encoder. The conventional optical encoder includes a first diffraction grating 1 (hereinafter referred to a "a first grating"), a second diffraction grating 2 (hereinafter referred to as "a second grating") disposed on the rear of the first grating in such a manner as to be movable relative to the first grating in directions indicated by the arrows, and a photoelectric conversion element 3 disposed on the rear of the second grating 2. The first and second gratings 1 and 2 each have a grating portion in which portions through which light is transmitted (hereinafter referred to as "light transmitting portions") and portions through which no light is transmitted (hereinafter referred to as "light non-transmitting portions") are alternately disposed at a predetermined distance (hereinafter referred to as "a grating pitch").

Parallel light ray L, which are incident on the first grating, pass through the first and second gratings 1 and 2, and are then made incident on the photoelectric conversion element 3. The photoelectric conversion element 3 converts the incident light into an electric signal corresponding to the intensity thereof and outputs that signal. This electric signal is a displacement signal obtained when the amounts of light which passes through the first and second gratings 1 and 2 change due to relative displacement of the first and second gratings 1 and 2. The period of the displacement signal is equal to the grating pitch. Although this displacement signal is supposed to be a triangular wave which is proportional to apparent changes of the light transmitting portions as viewed from the light emission side, which are caused by the overlapping of the first and second gratings 1 and 2, it is a false sine-wave signal in practical operations due to the light diffraction or the like. This false sine-wave is utilized as the displacement signal for position detection.

The distortion factor of the displacement signal obtained by the aforementioned conventional optical encoder changes greatly, as shown in FIG. 2, as the gap between the first and second gratings 1 and 2 changes. Variations in this distortion factor are mainly caused by a signal having a period which is a factor of ⅓ or 1/5 of that of the displacement signal (hereinafter referred to as "a third harmonic" or "a fifth harmonic") which is contained in the displacement signal. Thus, the position detection conducted by utilizing such a displacement signal generates errors. These errors may be reduced by fixing the gap between the first and second gratings 1 and 2. However, this requires a very high mounting accuracy.

SUMMARY OF THE INVENTION

In view of the aforementioned problem of the conventional techniques, an object of the present invention is to provide an optical encoder which is capable of stably outputting a less distorted displacement signal.

According to one aspect of the present invention, for achieving the object described above, there is provided an optical encoder including a first diffraction grating and a second diffraction grating which is displaceable relative to said first diffraction grating, said encoder being capable of detecting said relative displacement, the improvement being characterized in that said second diffraction grating has a grating pattern which removes a component having a period which is a factor of 1/n (n: a positive odd number) of the period of a displacement signal representing said relative displacement.

The nature, principle and utility of the invention will become more apparent from the following detailed description when read in conjunction with the accompanying drawings.

DESCRIPTION OF THE PREFERRED EMBODIMENT

Figure 1:
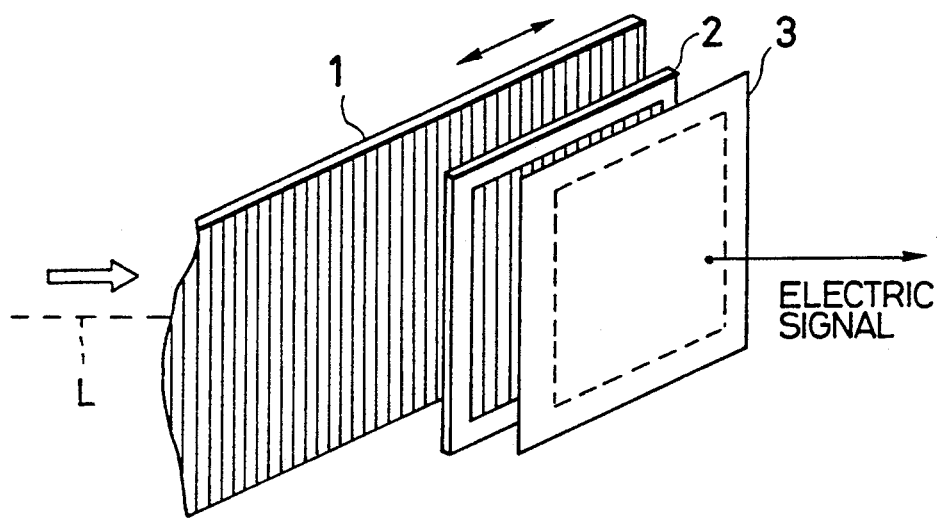
FIG. 1 is a perspective view of an example of a conventional optical encoder.
Figure 2:
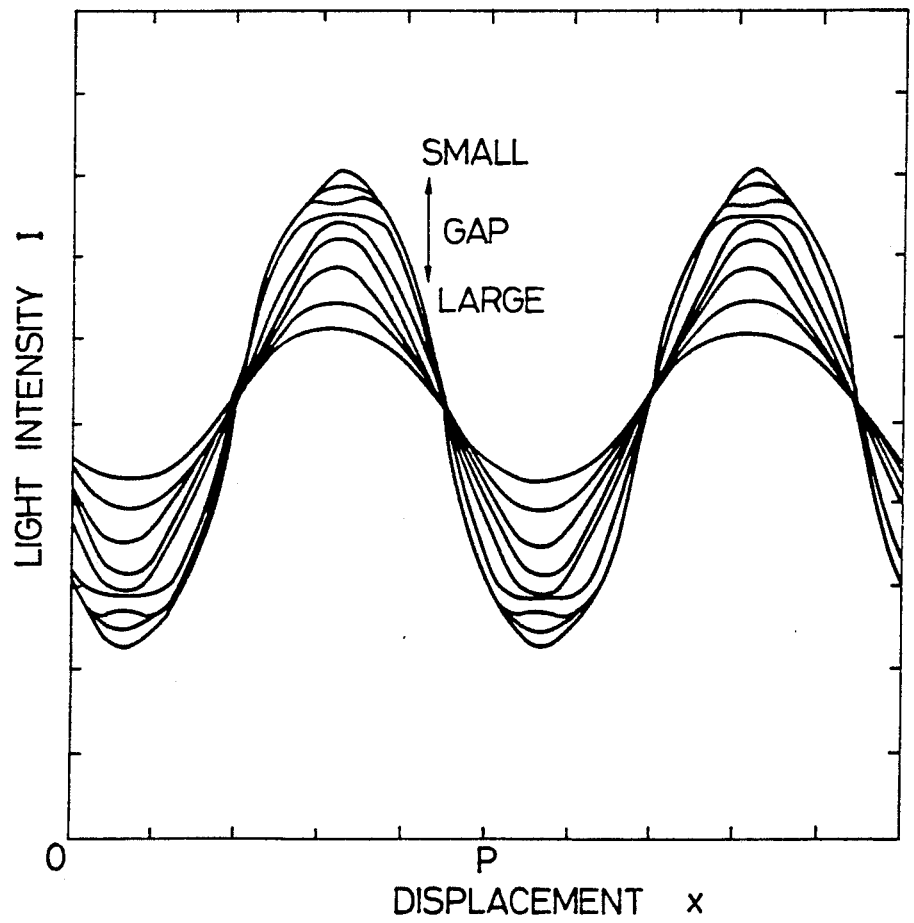
FIG. 2 is a graphic presentation of an example of the output waveform of the optical encoder of FIG. 1.
Figure 3:
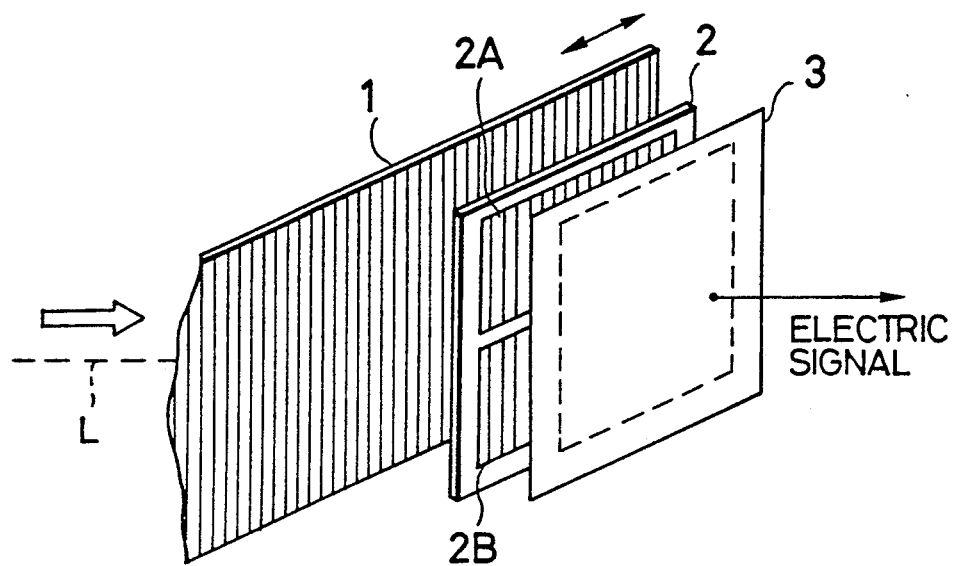
FIG. 3 is a perspective view of a first embodiment of an optical encoder according to the present invention.

FIG. 3 is a view similar to that of FIG. 1 and illustrates a first embodiment of an optical encoder according to the present invention. The same reference numerals are used to denote parts which are the same as those optical encoder shown in FIG. 1, description thereof being omitted.

Figure 4:
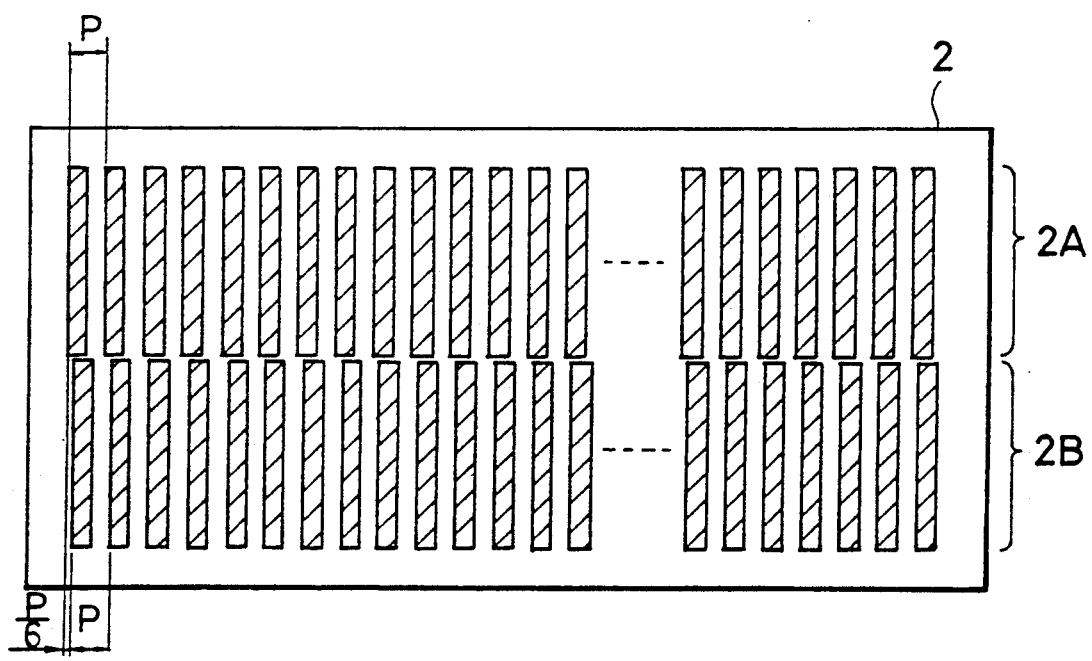
FIG. 4 shows an example of a grating portion of the optical encoder of FIG. 3.

In this optical encoder, the grating portion provided in the second grating 2 differs from that of the conventional optical encoder, and comprises gratings 2A and 2B which are aligned in a direction perpendicular to that in which the second grating 2 is moved relative to the first grating 1. The grating portions 2A and 2B each have light transmitting portions (indicated by the hatched areas) and light non-transmitting portions. The light transmitting portions are disposed in the grating portion 2A or 2B at a pitch P ranging from several $\mu$m to several hundreds of $\mu$m, as shown in FIG. 4. The grating portion 2A and the grating portion 2B are P/6 out of phase.

Changes in the amount of light which passes through the grating portion 2A, i.e., a displacement signal $I_A(x)$, are given by equation (1) with its main fundamental component and its third harmonic being noted:

$$I_A(x) = a \sin(2\pi x/P) \pm A \sin(3 \cdot 2\pi x/P) + B \quad (1)$$

Changes in the amount of light passes through the grating portion 2B which is P/6 out of phase with the grating portion 2A, i.e., a displacement signal $I_B(x)$, are given by equation (2).

$$\begin{aligned} I_B(x) &= a\sin(2\pi(x/P + 1/6)) \pm A\sin(3 \cdot 2\pi(x/P + 1/6)) + B \quad (2) \\ &= a\sin(2\pi x/P + \pi/3) \pm A\sin(3 \cdot 2\pi x/P + \pi) + B \end{aligned}$$

Figure 12:
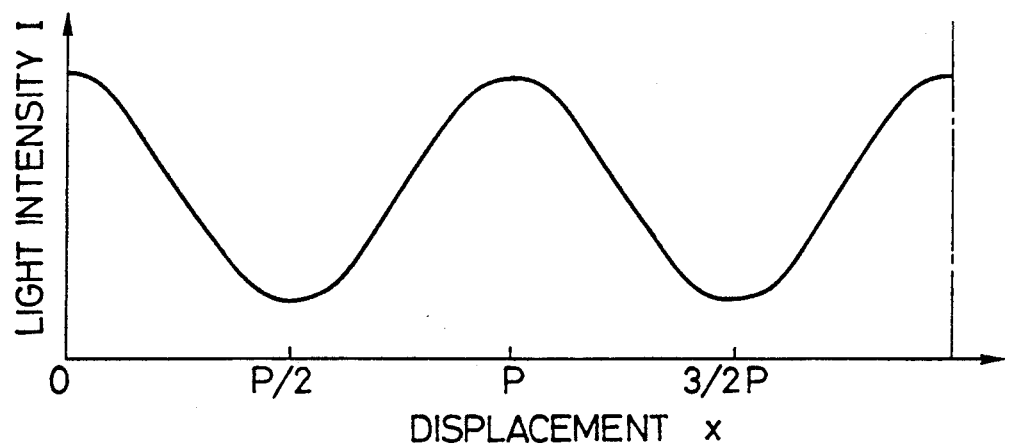
FIG. 12 is a graphic presentation of an example of the output waveform of the optical encoder according to the present invention.

Hence, the third harmonic can be cancelled and a highly accurate displacement signal, such as that shown in FIG. 12, can thereby be obtained by making the area of the grating portion 2A equal to that of the grating portion 2B to cause the same amount of light to pass through the grating portions 2A and 2B and by converting all the light which passes through the grating portions 2A and 2B into an electric signal to add up the amounts of light which passes through the grating portions 2A and 2B.

Figure 5:
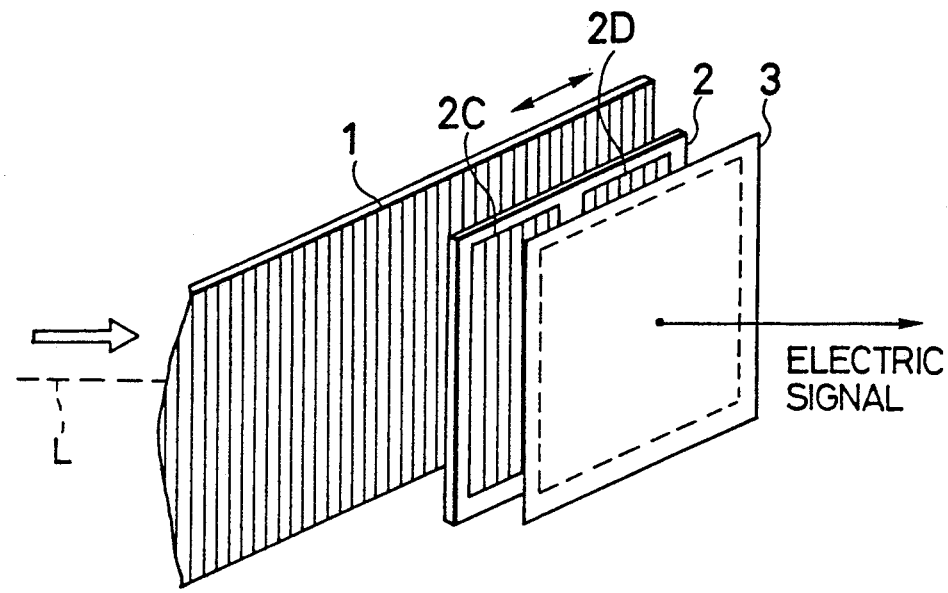
FIG. 5 is a perspective view of a second embodiment of an optical encoder according to the present invention.
Figure 6:
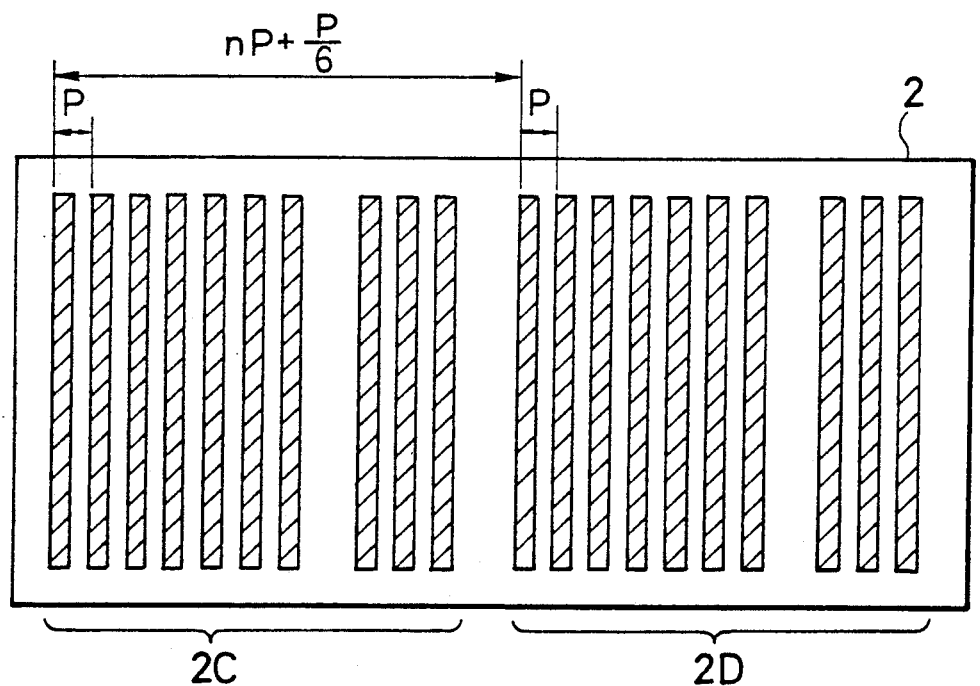
FIG. 6 shows an example of a grating portion of the optical encoder of FIG. 5.

FIG. 5 is a view similar to that of FIG. 3 and illustrates a second embodiment of an optical encoder according to the present invention. The same reference numerals are used to denote parts which are the same as those of the optical encoder shown in FIG. 3, description thereof being omitted. In this optical encoder, the grating portion of the second grating 2 comprises grating portions 2C and 2D which are aligned in the same direction as that in which the second grating 2 is moved relative to the first grating 1 and which have the same area. The grating portions 2C and 2D each have light transmitting portions (indicated by the hatched areas) and light non-transmitting portions. The light transmitting portions are disposed in the grating portions 2C or 2D at a pitch P ranging from several μm to several hundreds of μm, as shown in FIG. 6. The grating portions 2C and 2D are P/6 out of phase.

The thus-arranged second embodiment has the same advantage as that of the first embodiment for the same reason explained with the first embodiment.

Figure 7:
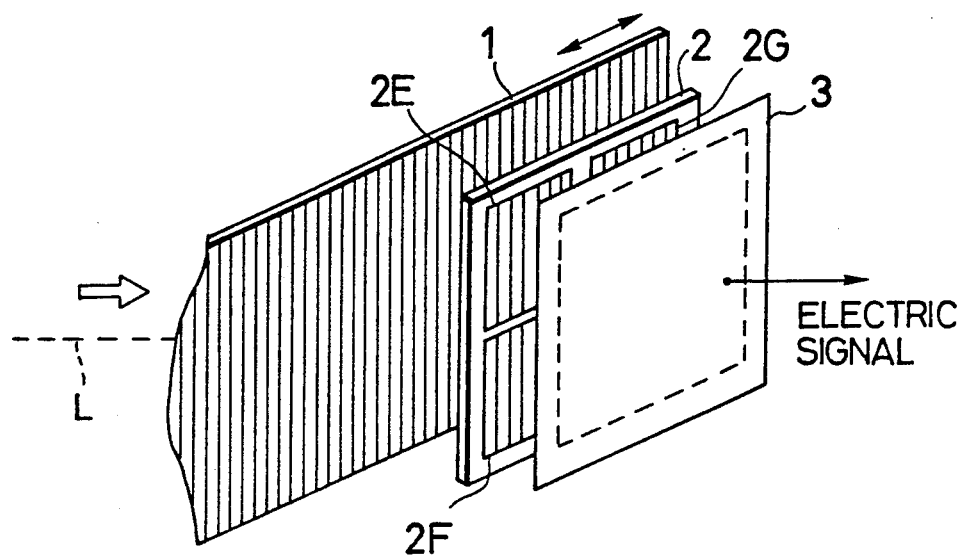
FIG. 7 is a perspective view of a third embodiment of an optical encoder according to the present invention.
Figure 8:
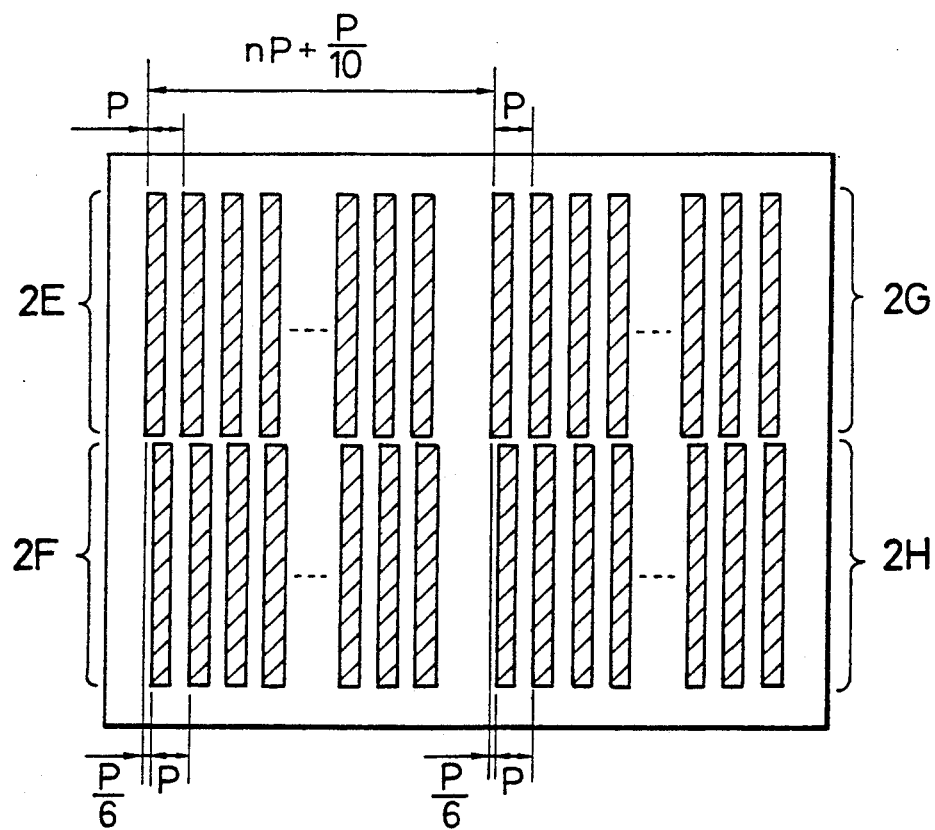
FIG. 8 shows an example of a grating portion of the optical encoder of FIG. 7.

FIG. 7 is a view similar to that of FIG. 3 and illustrates a third embodiment of an optical encoder according to the present invention. The same reference numerals are used to denote parts which are the same as those of the optical encoder shown in FIG. 3, description thereof being omitted. In this optical encoder, the grating portion of the second grating 2 comprises grating portions 2E, 2F, 2G and 2H which are aligned in two rows, two grating portions for each row, in the same direction as that in which the second grating 2 is moved relative to the first grating 1. The grating portions 2E, 2F, 2G and 2H have the same area. The grating portions 2E, 2F, 2G and 2H each have light transmitting portions (indicated by the hatched areas) and light non-transmitting portions. The light transmitting portions are disposed in the grating portion 2E, 2F, 2G or 2H at a pitch P ranging from several μm to several hundreds of μm, as shown in FIG. 8. The grating portions 2F, 2G and 2F are respectively P/6, P/10 and 4P/15 out of phase with the grating portions 2E.

Changes in the amount of light which passes through the grating portion 2E, i.e., a displacement signal $I_E(x)$, are given by equation (3) with a main fundamental component, a third harmonic and a fifth harmonic of the displacement signal being noted.

$$I_E(X) = a \sin(2\pi X/P) \pm A_3 \sin(3 \cdot 2\pi X/P) \pm A_5 \sin(5 \cdot 2\pi X/P) + B \quad (3)$$

Changes in the amount of light which passes through the grating portions 2F, 2G and 2H which are respectively P/6, P/10 and 4P/15 out of phase with the grating portion 2E, i.e., displacement signals $I_F(x)$, $I_G(x)$ and $I_H(x)$, are given by below equations (4), (5) and (6).

$$\begin{aligned} I_F(x) &= a\sin(2\pi(x/P + 1/6)) \pm A_3\sin(3 \cdot 2\pi(x/P + 1/6)) \pm \\ & \quad A_5\sin(5 \cdot 2\pi(x/P + 1/6)) + B \\ &= a\sin(2\pi x/P + \pi/3) \pm A_3\sin(3 \cdot 2\pi x/P + \pi) \pm \\ & \quad A_5\sin(5 \cdot 2\pi x/P + 5\pi/3) + B \end{aligned} \quad (4)$$

$$\begin{aligned} I_G(x) &= a\sin(2\pi(x/P + 1/10)) \pm A_3\sin(3 \cdot 2\pi(x/P + 1/10)) \pm A_5\sin(5 \cdot 2\pi(x/P + 1/10)) + B \\ &= a\sin(2\pi x/P + \pi/5) \pm A_3\sin(3 \cdot 2\pi x/P + 3\pi/5) \pm \\ & \quad A_5\sin(5 \cdot 2\pi x/P + \pi) + B \end{aligned} \quad (5)$$

$$\begin{aligned} I_H(x) &= a\sin(2\pi(x/P + 4/15)) \pm A_3\sin(3 \cdot 2\pi(x/P + 4/15)) \pm A_5\sin(5 \cdot 2\pi(x/P + 4/15)) + B \\ &= a\sin(2\pi x/P + 8\pi/15) \pm A_3\sin(3 \cdot 2\pi x/P + 24\pi/15) \pm A_5\sin(5 \cdot 2\pi x/P + 8\pi/3) + B \end{aligned} \quad (6)$$

Hence, the third harmonic and fifth harmonic can be cancelled and a highly accurate displacement signal, such as that shown in FIG. 12, can thereby be obtained by making the areas of the grating portions 2E, 2F, 2G and 2H equal to cause the same amount of light to pass through the grating portions 2E, 2F, 2G and 2H and by converting all the light which passes through the grating portions 2E, 2F, 2G and 2H into an electric signal to add up the amounts of light which passes through the grating portions 2E, 2F, 2G and 2H.

Figure 9:
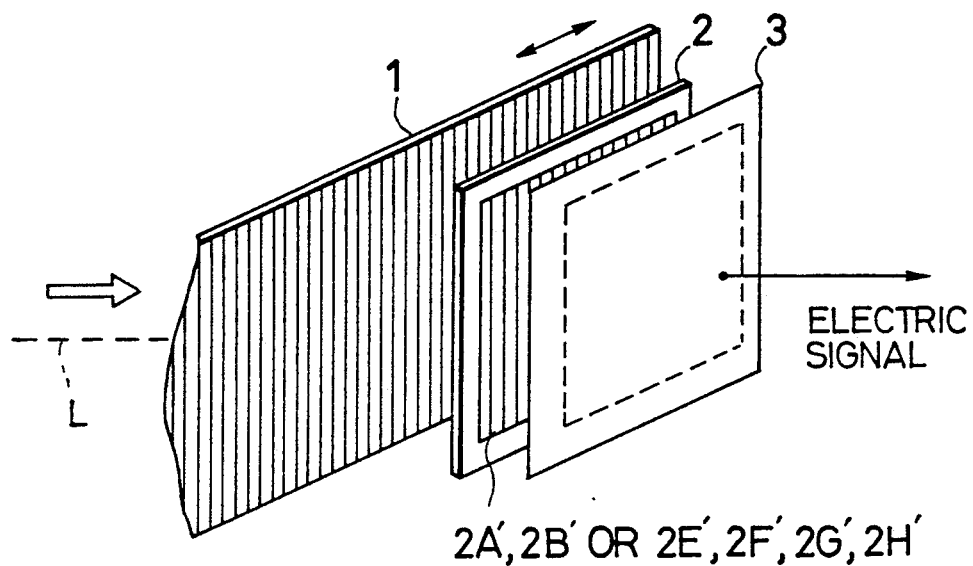
FIG. 9 is a perspective view of a fourth embodiment of an optical encoder according to the present invention.

FIG. 9 is a view similar to that of FIG. 3 and illustrates a fourth embodiment of an optical encoder according to the present invention. The same reference numerals are used to denote parts which are the same as those of the optical encoder shown in FIG. 3, description thereof being omitted. In this optical encoder, the grating has a grating portion shown in either FIG. 10 or 11.

Figure 10:
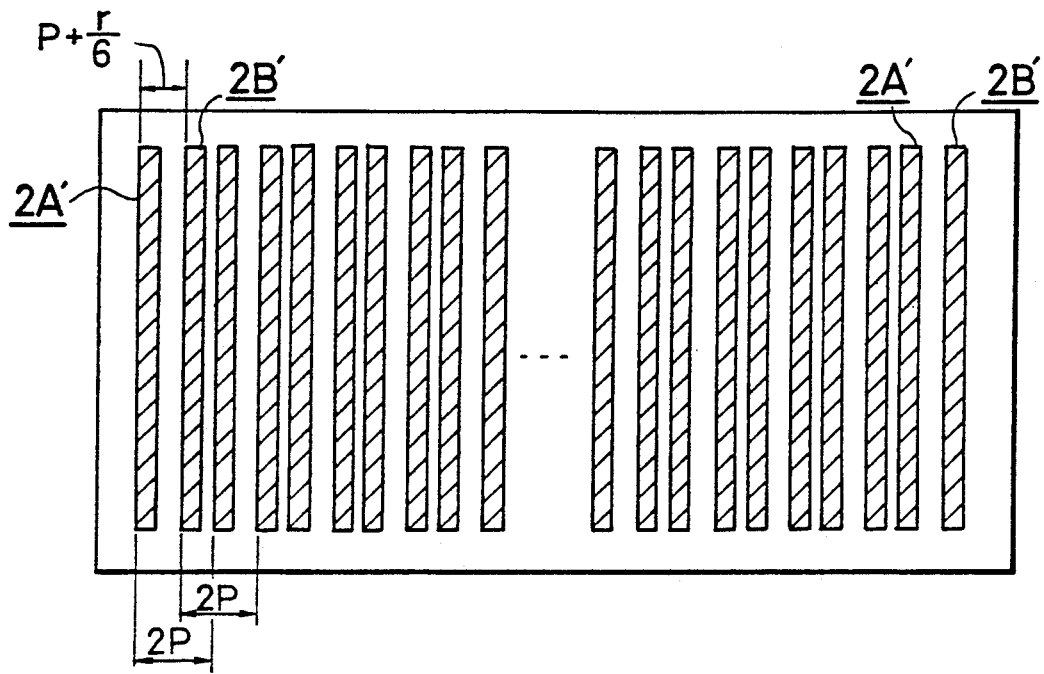
FIGS. 10 and 11 show an example of a grating portion of the optical encoder of FIG. 9.

The grating portion shown in FIG. 10 has light transmitting portions 2A' and light transmitting portions 2B'. The light transmitting portions 2A' are disposed at a pitch of 2P with P representing a value between several μm and several hundreds of μm. The light transmitting portions 2B' are each disposed between the adjacent light transmitting portions 2A' with each light transmitting portion 2B' being disposed at a position which shifts by (P+P/6) from the preceding light transmitting portions 2A'.

Changes in the amounts of light which passes through the light transmitting portions 2A', i.e., a displacement signal $I_A'(x)$, are given by equation (7) with its main fundamental component and its third harmonic being noted.

$$I_A'(x) = a \sin(2\pi x/P) \pm A \sin(3 \cdot 2\pi x/P) + B \quad (7)$$

Changes in the amounts of light which passes through the light transmitting portions 2B' which are P/6 out of phase with the light transmitting portions 2A', i.e., a displacement signal $I_B'(x)$, are given by equation (8).

$$I_B'(x) = a\sin(2\pi(x/P + 1/6)) \pm A\sin(3 \cdot 2\pi(x/P + 1/6)) + B \quad (8)$$
$$= a\sin(2\pi x/P + \pi/3) \pm A\sin(3 \cdot 2\pi x/P + \pi) + B$$

Hence, the third harmonic can be cancelled and a highly accurate displacement signal, such as that shown in FIG. 12, can thereby be obtained by making the area of the light transmitting portions 2A' equal to that of the light transmitting portions 2B' and by making the number of light transmitting portions equal to that of the light transmitting portions to pass the same amount of light through the light transmitting portions 2A' and 2B' and by converting all the light which passes through the light transmitting portions 2A' and 2B' into an electric signal to add up the amounts of light which passes through the light transmitting portions 2A' and 2B'.

Figure 11:
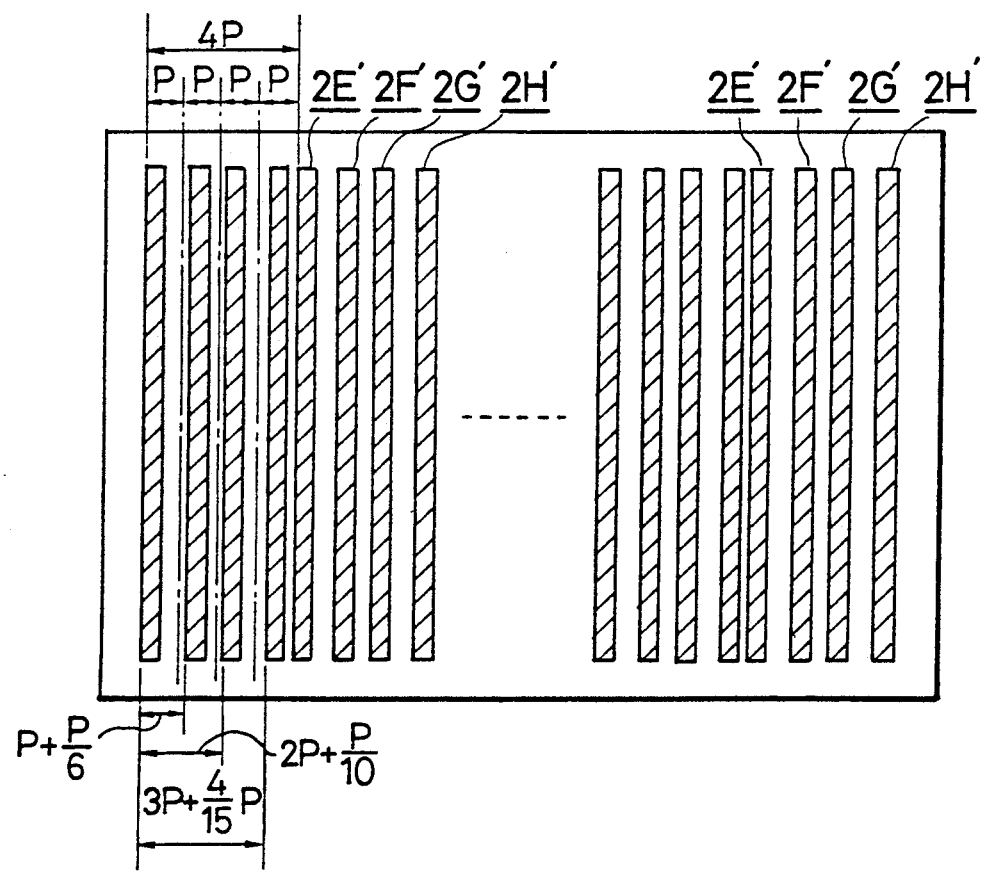

The grating portion shown in FIG. 11 has light transmitting portions 2E', 2F', 2G' and 2H'. The light transmitting portions 2E' are disposed in the grating portion at a pitch of 4P with P representing a value between several μm. The light transmitting portions 2F', 2G' and 2H' are each disposed between the adjacent light transmitting portions 2E' with the light transmitting portions 2F', 2G' and 2H' being respectively disposed at positions which shift by (P+P/6), (2P+P/10), (3P+4P/15) from the preceding light transmitting portions 2E'.

Changes in the amounts of light which passes through the light transmitting portions 2E', i.e., a displacement signal $I_E'(x)$, are given by equation (9) with its fundamental component, its third harmonic and its fifth harmonic being noted.

$$I_E'(x) = a\sin(2\pi X/P) \pm A_3 \sin(3 \cdot 2\pi X/P) \pm A_5 \sin(5 \cdot 2\pi X/P) + B \quad (9)$$

Changes in the amounts of light which passes through the light transmitting portions 2F', 2G' and 2H' which are respectively P/6, P/10 and 4P/15 out of phase with the light transmitting portions 2E', i.e., displacement signals $I_F'(x)$, $I_G'(x)$ and $I_H'(x)$, are given by equations (10), (11) and (12).

$$\begin{aligned}I_F'(x) &= a\sin(2\pi(x/P + 1/6)) \pm A_3\sin(3 \cdot 2\pi(x/P + 1/6)) \pm \\ &\quad A_5\sin(5 \cdot 2\pi(x/P + 1/6)) + B \\ &= a\sin(2\pi x/P + \pi/3) \pm A_3\sin(3 \cdot 2\pi x/P + \pi) \pm \\ &\quad A_5\sin(5 \cdot 2\pi x/P + 5\pi/3) + B\end{aligned} \quad (10)$$

$$\begin{aligned}I_G'(x) &= a\sin(2\pi(x/P + 1/10)) \pm A_3\sin(3 \cdot 2\pi(x/P + 1/10)) \pm A_5\sin(5 \cdot 2\pi(x/P + 1/10)) + B \\ &= a\sin(2\pi x/P + \pi/5) \pm A_3\sin(3 \cdot 2\pi x/P + 3\pi/5) \pm \\ &\quad A_5\sin(5 \cdot 2\pi x/P + \pi) + B\end{aligned} \quad (11)$$

$$\begin{aligned}I_H'(x) &= a\sin(2\pi(x/P + 4/15)) \pm A_3\sin(3 \cdot 2\pi(x/P + 4/15)) \pm A_5\sin(5 \cdot 2\pi(x/P + 4/15)) + B \\ &= a\sin(2\pi x/P + 8\pi/15) \pm A_3\sin(3 \cdot 2\pi x/P + 24\pi/15) \pm A_5\sin(5 \cdot 2\pi x/P + 8\pi/3) + B\end{aligned} \quad (12)$$

Hence, the third harmonic and fifth harmonic can be cancelled and a highly accurate displacement signal, such as that shown in FIG. 12, can thereby be obtained by making the areas of the light transmitting portions 2E', 2F', 2G' and 2H' equal, by making the numbers of light transmitting portions 2E', 2F', 2G' and 2H' equal to cause the same amount of light pass through the light transmitting portions 2E', 2F', 2G' and 2H' and by converting all the light which passes through the light transmitting portions 2E', 2F', 2G' and 2H' into an electrical signal to add up the amounts of light which passes through the light transmitting portions 2E', 2F', 2G' and 2H'. Furthermore, since the light transmitting portions having a plurality of phases are disposed uniformly in a single grating portion, a highly accurate displacement signal can be obtained even if distribution of the light intensity is not uniform.

In the above-described fourth embodiment of the present invention, the phase difference is P/6 or the like. However, the phase may be shifted cyclically, e.g., beginning with −P/6, then 0, and ending with +P/6.

In each of the aforementioned embodiments, the third harmonic or the fifth harmonic is removed. However, it is also possible to eliminate seventh harmonic, ninth harmonic and so on. Also, all the light which passes through the individual grating is added by receiving them by the single photoelectric conversion element. However, all the light which passes through the individual gratings may be added by an electrical means after they have been received by the individual photoelectric conversion elements. In that case, an electric mechanism for adjusting the ratio of the amounts of light to be added (e.g., an addition ratio adjusting means provided in advance of the addition means) or an optical mechanism (e.g., a movable light blocking plate provided at each grating portion) may also be included. Furthermore, the light transmitting portion may have a triangular, polygonal or circular form. Alternatively, the light transmitting portion may be formed by a hyperbolic curve.

As will be understood from the foregoing description, according to the optical encoder of the present invention, a highly accurate position detection is achieved because of the removal of the error components. Consequently, a highly accurate machining is made possible in a machine tool or the like, and productivity can thus be increased.

It should be understood that many modifications and adaptations of the invention will become apparent to those skilled in the art and it is intended to encompass such obvious modifications and changes in the scope of the claims appended hereto.

What is claimed is:

1. An optical encoder including a first diffraction grating and a second diffraction grating which is displaceable relative to said first diffraction grating, said encoder being capable of detecting said relative displacement.

the improvement being characterized in that said second diffraction grating has a grating pattern which removes a component having a period which is a factor of 1/n (n: a positive odd number) of the period of a displacement signal representing said relative displacement.

2. An optical encoder according to claim 1, wherein said grating pattern provided on said second diffraction grating includes two grating portions which are out of phase by one sixth a pitch for said first diffraction grating.

3. An optical encoder according to claim 2, further including a photoelectric conversion means for converting all the light which passes through or is reflected by said two grating portions into an electrical signal.

4. An optical encoder according to claim 1, wherein said grating pattern provided on said second diffraction grating includes four grating portions, one grating portion whose phase is a standard, and three grating portions which are respectively out of phase by one sixth, one tenth and four fifteenth of a pitch for said first diffraction grating relative to the grating portion which serves as the standard.

5. An optical encoder according to claim 4, further including a photoelectric conversion means for converting all the light which passes through or is reflected by said four grating portions into an electrical signal.

6. An optical encoder according to claim 1, wherein the grating pattern provided on said second diffraction grating includes pairs of light transmitting portions whose phase is a standard and light transmitting portions which are out of phase by one sixth of a pitch for said first diffraction grating relative to said standard light transmitting portions, said pairs havig a period twice that for said first diffraction grating.

7. An optical encoder according to claim 1, wherein the grating pattern provided on said second diffraction grating includes sets of light transmitting portions whose phase is a standard and light transmitting portions which are respectively out of phase by one sixth, one tenth and four fifteenth of a pitch for said first diffraction grating relative to said reference light transmitting portions, said sets having a period four times that for said first diffraction grating.

* * * * *